US006929436B2

(12) United States Patent
Shannon

(10) Patent No.: US 6,929,436 B2
(45) Date of Patent: Aug. 16, 2005

(54) METHOD AND APPARATUS FOR FORMING PATTERNS IN FLAT, PLASTIC FLOOR COVERINGS

(76) Inventor: Stephen Shannon, 359 Linden Ct., Herndon, VA (US) 20170

( * ) Notice: Subject to any disclaimer, the term of this patent is extended or adjusted under 35 U.S.C. 154(b) by 430 days.

(21) Appl. No.: 10/058,006

(22) Filed: Jan. 29, 2002

(65) Prior Publication Data

US 2003/0141621 A1 Jul. 31, 2003

(51) Int. Cl.[7] .................................................. B23C 1/20
(52) U.S. Cl. ........................ 409/178; 409/180; 409/182; 144/136.95; 144/154.5; 144/144.1
(58) Field of Search ................................ 409/175, 178, 409/179, 180, 181, 182; 144/136.95, 154.5, 144.1, 144.51, 144.52

(56) References Cited

U.S. PATENT DOCUMENTS

| | | | | | |
|---|---|---|---|---|---|
| 1,907,738 | A | | 5/1933 | Christman | |
| 2,217,998 | A | | 10/1940 | Buttress | |
| 2,243,778 | A | | 5/1941 | Stansel | |
| 2,296,232 | A | | 9/1942 | Drain | |
| 2,490,119 | A | | 12/1949 | Edinger | |
| 2,600,728 | A | | 6/1952 | Bernard | |
| 2,790,245 | A | | 4/1957 | Wilkes | |
| 2,933,021 | A | * | 4/1960 | Kennedy et al. | 409/180 |
| 2,958,131 | A | * | 11/1960 | Keene | 409/130 |
| 3,266,160 | A | | 8/1966 | Toien | |
| 3,456,555 | A | * | 7/1969 | Dunlap | 409/179 |
| 3,768,347 | A | | 10/1973 | Wade et al. | |
| 3,934,342 | A | | 1/1976 | Matsushita | |
| 4,057,898 | A | | 11/1977 | Piosky | |
| 4,064,627 | A | | 12/1977 | Zanfini | |
| 4,143,691 | A | * | 3/1979 | Robinson | 144/154.5 |
| 4,194,543 | A | | 3/1980 | Cotton | |
| 4,197,887 | A | * | 4/1980 | Groves | 144/136.95 |
| 4,294,297 | A | * | 10/1981 | Kieffer | 144/154.5 |
| 4,323,100 | A | * | 4/1982 | Silken | 144/154.5 |
| 4,330,939 | A | | 5/1982 | Robinson | |
| 4,443,942 | A | | 4/1984 | Demeter | |
| 4,502,232 | A | | 3/1985 | Broders | |
| 4,539,757 | A | | 9/1985 | Shyu | |
| 4,640,324 | A | * | 2/1987 | Lounds | 144/154.5 |
| 4,648,181 | A | | 3/1987 | Fortin | |
| 4,656,901 | A | | 4/1987 | Axford et al. | |
| 4,685,496 | A | * | 8/1987 | Livick | 144/154.5 |
| 4,763,707 | A | * | 8/1988 | Hounshell | 144/136.95 |
| 4,793,033 | A | | 12/1988 | Schneider et al. | |
| 4,833,956 | A | | 5/1989 | Roberts | |
| 4,844,757 | A | | 7/1989 | Nagata et al. | |
| 5,123,463 | A | * | 6/1992 | Grisley | 144/83 |
| 5,188,013 | A | | 2/1993 | Cardinale | |
| 5,353,508 | A | | 10/1994 | Baker | |
| 5,452,751 | A | * | 9/1995 | Engler et al. | 144/253.6 |
| 5,699,844 | A | * | 12/1997 | Witt | 144/329 |
| 5,788,561 | A | | 8/1998 | Pearlman et al. | |
| 5,946,808 | A | | 9/1999 | Martinez | |
| 6,044,570 | A | | 4/2000 | Nochowitz | |
| 6,112,417 | A | | 9/2000 | Hyer et al. | |
| 6,226,878 | B1 | | 5/2001 | Shannon | |
| 6,230,410 | B1 | | 5/2001 | Taylor et al. | |
| 6,308,422 | B1 | | 10/2001 | MacDonald | |

* cited by examiner

*Primary Examiner*—Daniel W. Howell
(74) *Attorney, Agent, or Firm*—Miles & Stockbridge P.C.; Edward J. Kondracki

(57) ABSTRACT

A method and apparatus for forming patterns in a flat, plastic material, such as, for example sheet vinyl, linoleum, and other flat sheet floor covering. The apparatus comprises a router die and trimmer base affixed to a router machine. The router die is comprised of two guiding members, a first guiding member that directs the router blade between an edge of a pattern and an edge of an overlay. A second guiding member follows the blade after the groove is cut.

14 Claims, 6 Drawing Sheets

METHOD AND APPARATUS FOR FORMING PATTERNS IN FLAT, PLASTIC FLOOR COVERINGS

FIELD OF THE INVENTION

The present invention relates to grooving machines, and more particularly to grooving machines used for styling or forming designs or patterns in flat, plastic materials and methods for forming such designs and patterns.

BACKGROUND OF THE INVENTION

A wide variety of architectural and interior design projects require intricate, non-linear cuts in flat, plastic materials. This is especially true in the field of floor coverings where it has become desirable to apply custom designs to flat, plastic materials such as linoleum and sheet vinyl. Designs may be composed of numerous shapes, lines, and colors. Demand for complex designs has resulted in a concurrent increase in the cost, equipment, skill, and labor necessary to implement such designs.

When applying a design to a floor covering such as linoleum, it is often desirable to apply two or more pieces of floor covering to the design in order to achieve the desirable shapes, lines, and colors of the desired pattern. As it is well known to one familiar in the art of applying decorative patterns to floor coverings, a relatively narrow and exceptionally smooth groove is required between adjacent edges of the pieces of linoleum to achieve a structurally sound and visually appealing seam. The groove receives hot melt glue from a conventional heat welder that, once hardened, provides a structurally ample join between adjacent edges of linoleum. Prior to heat welding, a well executed smooth and even groove between adjacent edges of linoleum results to a visually satisfying, precise, and desirable final design. Likewise, a poorly cut, choppy, and uneven groove results in a visually unsatisfying, sloppy, and undesirable final design.

A hand groover is one conventional tool in the art for cutting grooves between adjacent pieces of linoleum and sheet vinyl. While it is sufficient for rough cuts, a hand groover requires the craftsmanship of a highly skilled artisan for complex, non-linear designs or final cuts. Such skill takes years to master. Even so, a hand groover frequently leaves undesirable rough edges in the groove, particularly in linoleum which is often stiff and brittle. Such rough edges result in a sloppy and unacceptable final design. Pattern designs requiring high quality and extensive cuts require costly training to produce cuts at an acceptable level. The labor cost of a highly skilled artisan, coupled with the time and patience of using a hand groover are undesirable disadvantages of a present method for creating designs.

Resort has been made to routing machines that help speed the ability to make grooves. However, conventional portable routing machines are designed to cut only linear patterns or very obtuse curves. The conventional portable routing machine precludes the numerous tight and non-linear curves that today's design projects require. Conventional portable routing machines are also very expensive and add undesirable overhead costs.

An alternative approach is to use a stationary routing machine connected to AutoCAD software. However, this type of machine is very expensive and too large to be moved to and from job sites. Further, the costs and time associated with shipping the finished materials to a job site add undesirable overhead to the finished project. In addition, on-site modifications to a design may conflict with a cut already executed off-site and often cannot easily be done.

SUMMARY OF THE INVENTION

The present invention provides a method and apparatus that minimizes the above-identified drawbacks for cutting complex, non-linear patterns in flat, plastic floor coverings.

In accordance with one embodiment of the invention, a trimmer base and die are affixed to a routing machine. The die comprises a base plate which supports two guide members disposed on opposite sides of a router blade to be used for guiding the pattern grooving machine between the edges of a rough linear or non-linear groove formed by adjacent edges of two pieces of floor covering. The first guide member has a diameter smaller than that of the second guide member. The first guide member follows an existing rough groove ahead of the router blade that makes a cut in the flooring. The second guiding member trails the router blade in the final widened, smoothed groove and helps to keep the blade from wandering. Thus there is provided an inexpensive tool which enables non-skilled artisans to form complex, nonlinear patterns in flat materials.

The preferred method of operation embodies a technique for utilizing the nonlinear pattern grooving machine of the present invention to form intricate patterns in floor coverings such as sheet vinyl, linoleum, and other flooring materials.

DETAILED DESCRIPTION OF THE INVENTION

Figure 1:
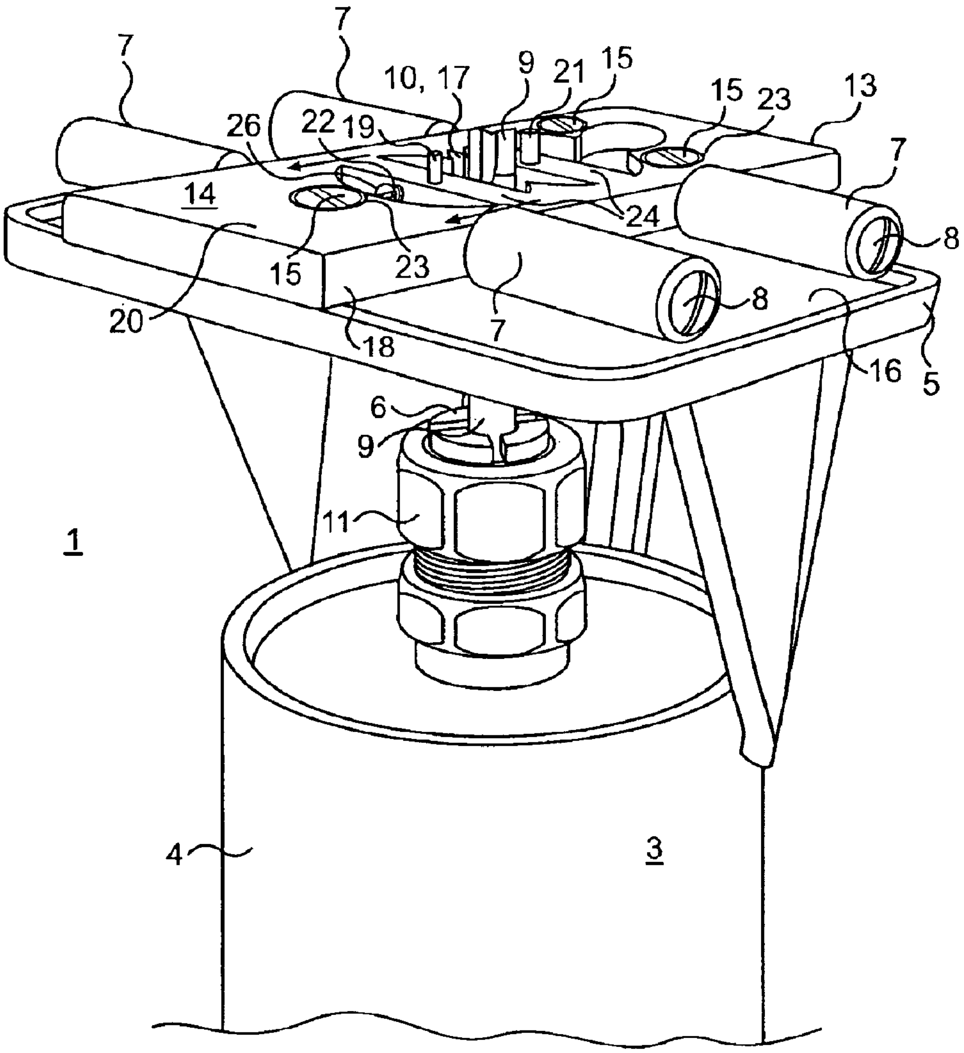
FIG. 1 shows a perspective view of one embodiment of the present invention.
Figure 2:
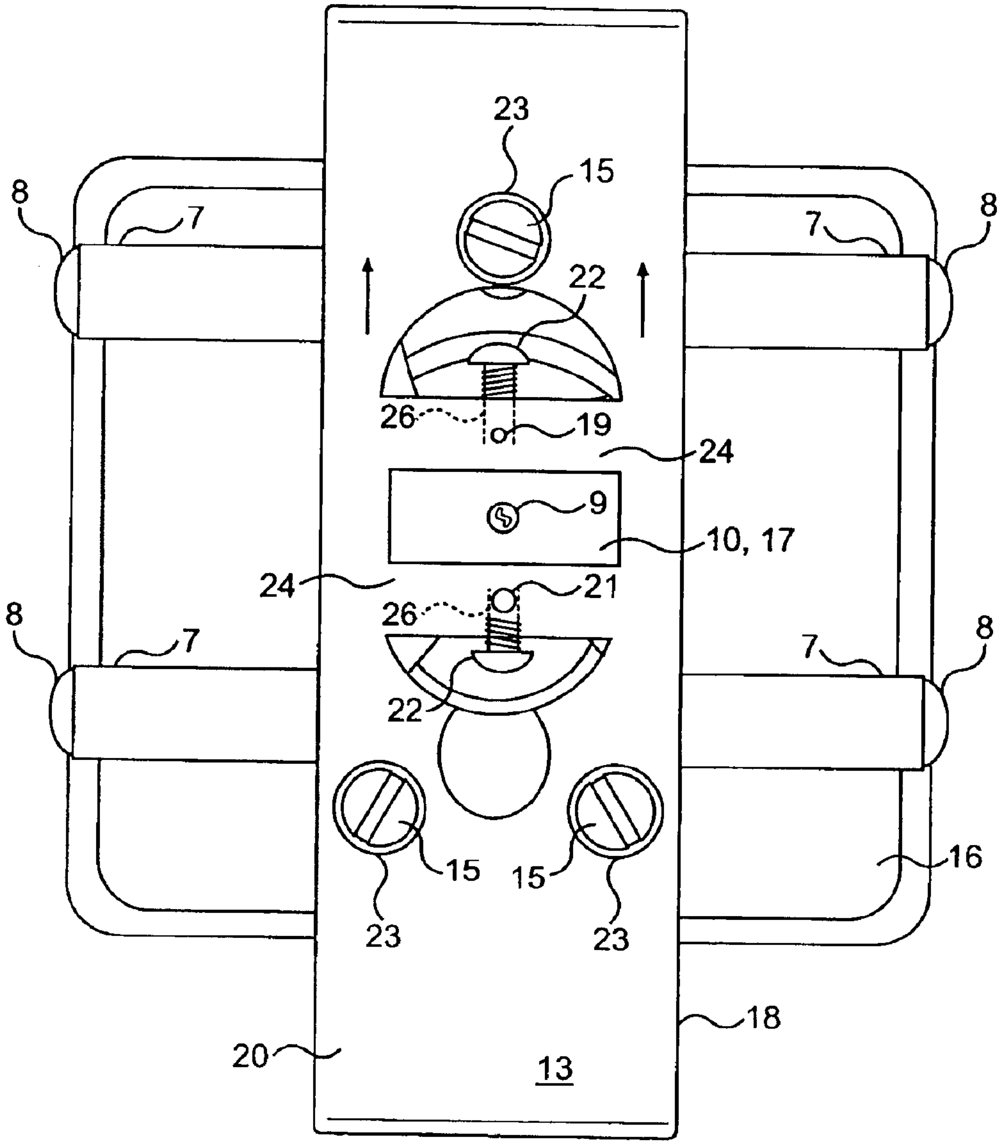
FIG. 2 is a bottom elevation view of FIG. 1.
Figure 3:
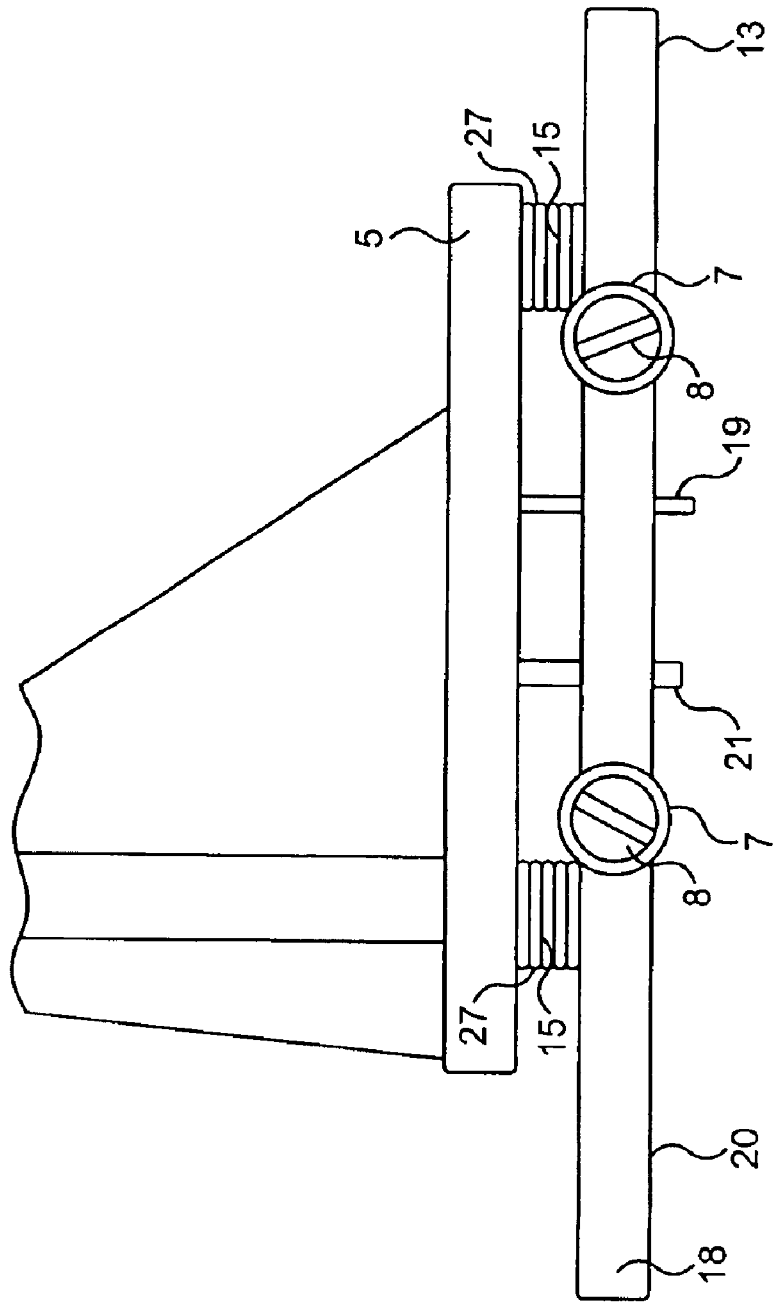
FIG. 3 is a fragmentary, side elevation view of a trimmer base shown in FIG. 1, and FIG. 4, comprising views 4A, 4B, 4C, 4D, and 4E, illustrates various steps or stages of the present invention method by which a pattern is formed in a flat, floor covering material.

A detailed description of one embodiment of the present invention follows with reference to FIGS. 1–3. A pattern grooving machine 1 is comprised of a conventional portable routing machine 3, trimmer base 5, and a router die 14. The routing machine 3 may be a Porter-Cable Router Model 7301 as depicted in FIG. 1, or other equivalent routing machine. The conventional trimmer base 5 is affixed in a conventional manner to the body 4 of the routing machine 3. The trimmer base 5 may be a conventional Porter-Cable Laminate Trimmer Base, Type 1 Model 7309 as depicted in FIG. 1, or other equivalent trimmer base. The manner in which the trimmer base 5 is affixed to the routing machine 3 is not critical to the operation of the pattern grooving machine 1, and is well known to one skilled in the art. A rotating shaft 11 extends from the routing machine 3 in conventional fashion and includes a chuck 6 that holds a router blade 9 which acts as the cutting mechanism. The rotating shaft 11 may hold the router blade 9 using a conventional bit and key system or any other equivalent means. Router die 14 is mounted to the trimmer base 5 so as to permit router blade 9 to project through a central opening 17 in the router die 14. During operation of the pattern grooving machine, the rotating shaft 11 is engaged by a motor of the router machine 3, resulting in the rotary motion of the rotating shaft 11 and consequently the router blade 9. The router blade 9 may be raised or lowered by the operator to score, scribe, or completely cut the floor covering material.

Router die 14 comprises base plate 13 having one face which sits flush with the face 16 of trimmer base 5 opposite the routing machine 3 and is fastened to the trimmer base 5 by bolts 15. To maintain a level cut and provide smooth movement over the plastic flooring material in which a pattern is to be formed, four (4) rollers 7 extend outward from opposite sides of base plate 13 as shown in FIG. 1. Each roller 7 is freely rotatable on its mounting bolt 8 threaded into the sides 18 of the base plate 13. Bolts 8 act as an axle on which rollers 7 rotate. The diameters of each roller 7 are equivalent to one another and larger than the height of the side 18 of base plate 13 to provide a virtual plane surface that extends in parallel to the plane of surface 20 of base plate 13 but slightly spaced therefrom. This allows the cutting action of router blade 9 to take place without having the surface 20 of base plate 13 functionally interfere with the material in which a groove is being formed. It can be appreciated that during the cutting operation the surface 20 of base plate 13 will be positioned slightly above the material in which the pattern is formed, thus allowing debris from the cutting operation to be displaced from the cut. As best seen in FIG. 3, the base plate 13 is spaced slightly away from the trimmer base 5 by spacers or washers 27 disposed on each bolt 15 to provide clearance for each roller 7 to rotate without obstruction of the base plate 13. Washers 23 are disposed on each bolt 15 and adjacent to surface 20 of base plate 13. The router blade 9 protrudes through a centered base plate hole or opening 17 in base plate 13 coaxially aligned with a centered opening 10 in trimmer base 5 to permit contact against the surface to be cut.

Mounted on either side of the centered base plate opening 17 are two cylindrical guide members 19 and 21 which are aligned along the longitudinal axis of base plate 13 that passes through the center of central opening 17. The first guide member 19 is mounted to one side of base plate hole 17, so as to lead the router blade 9 when the pattern grooving machine 1 is in operation as shown by the arrows in FIG. 2. The second guide member 21 is mounted to the other side or behind the base plate hole 17 in the direction of movement, so as to trail the router blade 9 when the pattern grooving machine 1 is in operation, i.e. being used to form a pattern. Guide members 19, 21 may be fastened to the base plate 13 by bolts or lock keys 22 as best shown in FIG. 2 which are threaded through lateral threaded opening 26 provided in cross bar supports 24. However, guide members 19, 21 may be mounted to base plate 13 in any suitable manner, such as, for example, being press filled in predrilled openings into which one end of the guide member is disposed. The diameter of the first guide member 19 is smaller than the diameter of the second guide member 21, so that when the grooving machine 1 is in operation, the first guide member 19 guides the grooving machine 1 in an existing first rough and narrow gap in the material being worked on, while the second guide member 21 guides the grooving machine 1 through a final widened, smooth groove freshly cut by the router blade 9. Preferably, the diameter of the first guide member 19 is 1⁄16 in. and the diameter of the second guide member 21 is ⅛ in. The distance of separation between guiding members 19, 21 may be ½ to 2 in. in a typical embodiment to permit non-linear cuts to be made. A non-linear design with tighter curves may require a smaller distance of separation between guiding members 19, 21 and a design with more obtuse curves may justify a larger distance of separation. Different distances may be used in alternative embodiments depending on design or pattern requirements.

Figure 4A:
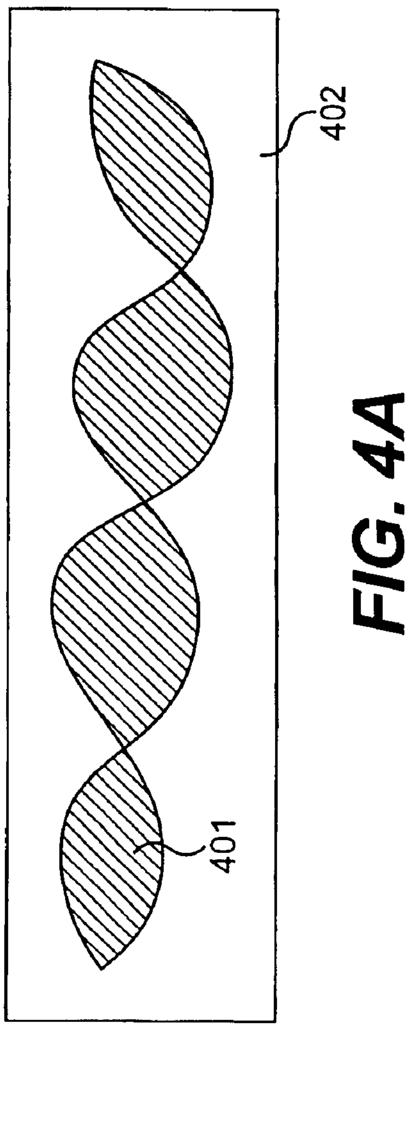
Figure 4A:
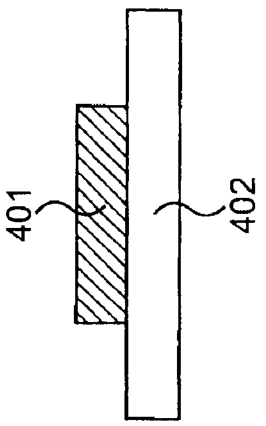
Figure 4B:
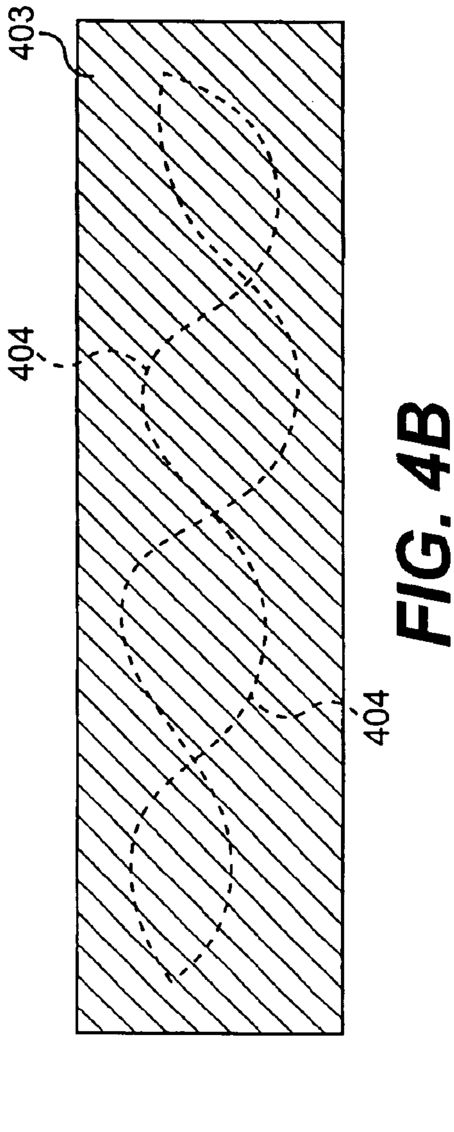
Figure 4B:
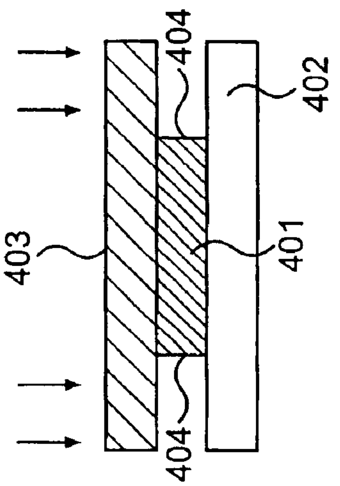
Figure 4C:
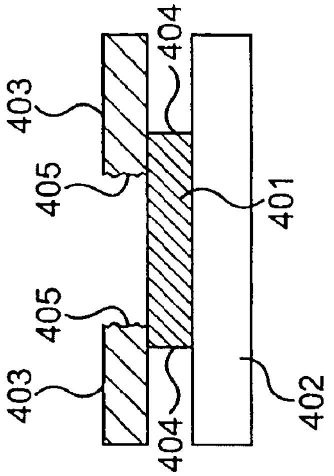
Figure 4D:
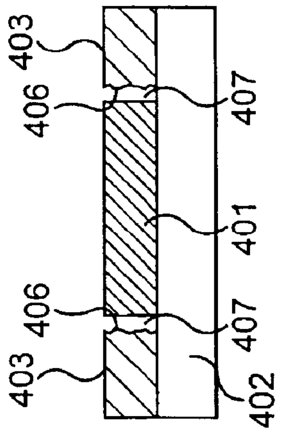
Figure 4C:
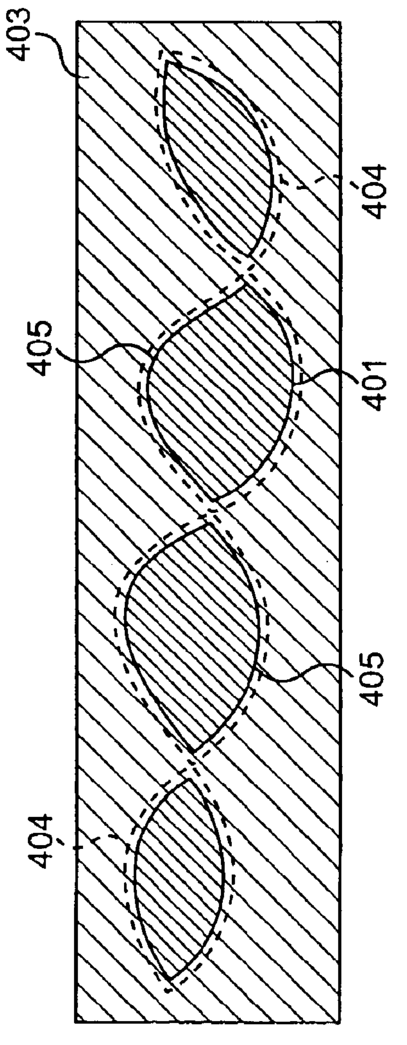
Figure 4D:
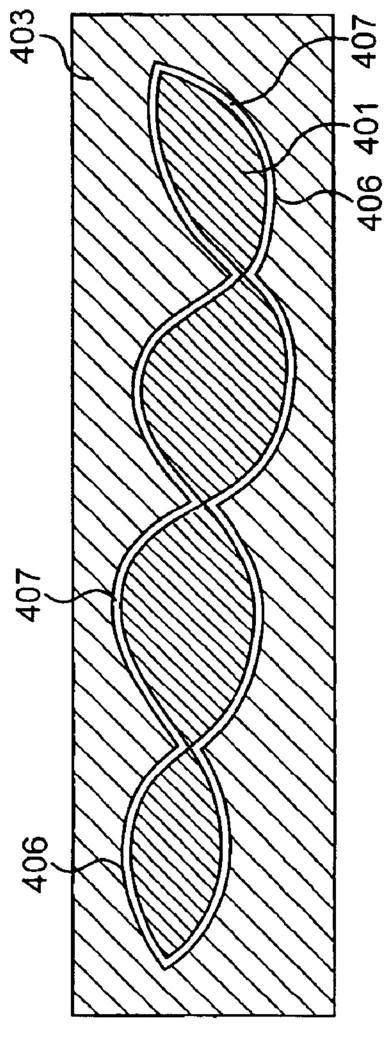

The present invention is particularly well suited to cut decorative patterns into any flat plastic-like material. The following method of operation is described in the context of applying designs to floor coverings such as linoleum. As shown in FIG. 4A, a prepared linoleum template of pattern 401 is adhered or tacked to the floor 402 using a conventional floor covering adhesive and is to be used as part of the final floor covering. This pattern 401 may be any shape, size, or color(s), and may be formed by a single piece of linoleum or multiple pieces of linoleum. Although pattern 401 is a floor covering material in the preferred embodiment, any sufficient material may be used for the template. The pattern 401 may be formed by applying the method and apparatus of my previous U.S. Pat. No. 6,226,878, the subject matter of which is incorporated by reference in its entirety. Pattern 401 provides a raised surface on floor 402 as shown in FIG. 4A'. Overlay 403, also a linoleum floor covering of any color and of a larger dimension than pattern 401 is placed on top of pattern 401 as shown in FIGS. 4B and 4B'. Overlay 403 is fastened or secured to prevent it from shifting. This may be by tacking, using an adhesive between the floor and overlay 403 at the feasible areas, or simply weights at selected areas. The outline of pattern 401 should be readily noticeable on the overlay 403 so that pressure may be applied to overlay 403 to emphasize the pattern edge 404 of underlay 401. Such pressure is indicated by arrows shown in FIG. 4B' and may be applied by the palm of a hand. A first rough cut 405 is then made through overlay 403 by a hook knife, or other equivalent knife or instrument for cutting linoleum. Care is taken to cut only through overlay 403 and not into pattern 401. The dimension of the rough cut 405 in overlay 403 is kept smaller than the dimension of pattern 401 as shown in FIGS. 4C and 4C'. An underscriber, well known to those skilled in the art, is then set to mark approximately a 1⁄16 in. gap and utilized to subsequently score the overlay 403 to replicate the pattern 401 at edge 404 to a dimension that is approximately 1⁄16 in. larger than pattern 401. A hook knife then may be used to cut along the fresh score through the depth of the overlay 403 resulting in edges 406 of overlay 403. After completion of the cut at edges 406, the overlay 403 lies flush on the floor and in the same horizontal plane as the pattern 401 as depicted in FIG. 4D'. A small rough gap 407 of about 1⁄16 in. remains between overlay 403 and pattern 401.

In accordance with the present invention, the afore-described pattern grooving machine 1 is used to widen this rough 1⁄16 in. gap 407 to a width of about ⅛ in. smooth groove to provide a border in which coloration may be added. Further, roughness in the cut left by the hook knife is smoothed by the pattern grooving machine 1 to provide a visually satisfying and desirable seam in the final design. A ⅛ in. groove is of sufficient size to allow insertion of a plastic welding material, which by heat welding is melted and welded in place to outline and mold the pattern 401 to the overlay 403. To affect the design, the router blade 9 and first guide member 19 of grooving machine 1 is placed in the 1⁄16 in. gap 407 with the first guide member 19 leading the router blade 9. The pattern grooving machine 1 is moved along gap 407. Router blade 9 widens the groove and provides an accurate and smooth ⅛ in. cut 407 between the adjacent edges or sides of the pattern 401 and overlay 403, leaving a clean edge on overlay 403. The ⅛ in. diameter guide member 21 that is disposed in the ⅛ in. diameter freshly cut groove 407 guides the machine along the edge of the pattern 401 and overlay 403. The pattern grooving machine 1 is pushed along the gap 407 until the pattern 401 is completely traced and the entire length of the gap or groove 407 is widened to a ⅛ in. groove.

Figure 4E:
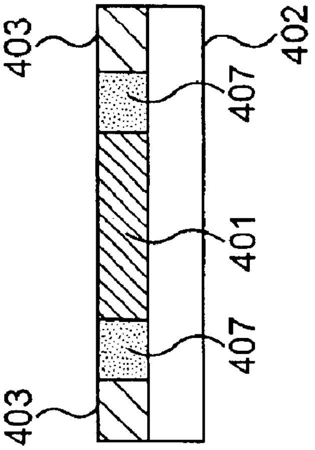
Figure 4E:
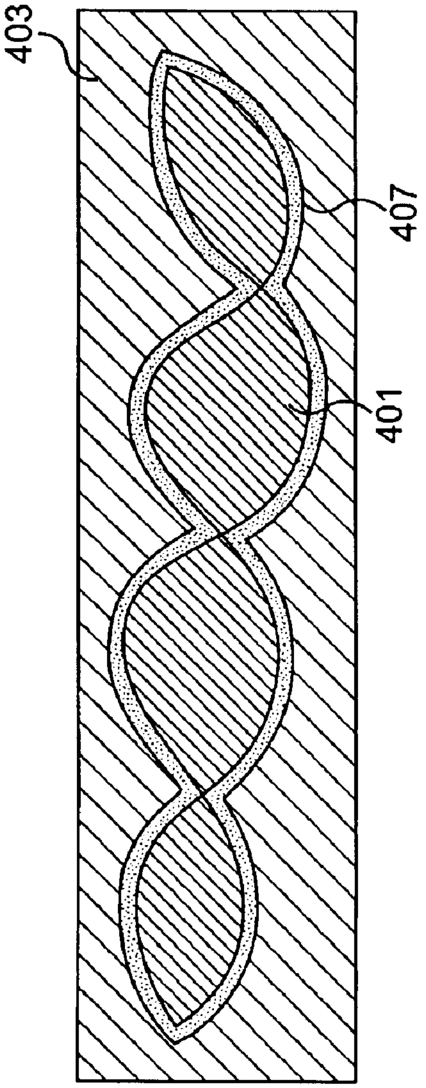

With the groove 407 thus widened and smoothed, conventional heat welding methods and tools, such as a Leister welder model no. CH-6056 may be used to join pattern 401 to the adjacent floor covering 403 as shown in FIG. 4E'. The heat weld forms a decorative border along the pattern 401. Any coloration of welding material may be used, as desired, to complete the design. Many intricate designs may thus be economically made without resort to expensive machinery and with a minimum period of training for unskilled personnel.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A pattern grooving machine for cutting non-linear grooves in a flat, plastic floor covering, the machine comprising a power router adapted to receive a rotatable router blade, a trimmer base affixed to the router, the trimmer base having an opening through which the router blade extends when in use, a base plate affixed to the trimmer base, the base plate having a first and a second surface, the first surface of said base plate being positioned adjacent the trimmer base a central opening in said base plate through which the router blade extends when in use, a first guide member disposed to one side of the central opening, a second guide member disposed to another side of the central opening, said first and said second guide members extending outwardly from the second surface of said base plate, and at least one pair of rollers supported by said base plate to facilitate movement of the apparatus along a flat layer.

2. A router die, comprising a base plate having a central opening, said base plate adapted to support a first outwardly extending guide member disposed to one side of said opening, and a second outwardly extending guide member disposed to another side of said opening, the size of said second guide member being greater than that of said first guide member, and at least one pair of rollers supported by said base plate to facilitate movement of the router die along a flat layer when cutting a groove.

3. The pattern grooving machine of claim 1, wherein the first guide member and the second guide member are cylindrical, the first guide member having a diameter less than the diameter of the second guide member.

4. The pattern grooving machine of claim 3, wherein the diameter of the first guide members is about 1/16 in. and the diameter of the second guide member is about 1/8 in.

5. The pattern grooving machine of claim 1, wherein the rollers are supported at opposite sides of the base plate.

6. The pattern grooving machine of claim 5, wherein the rollers have a diameter greater than the thickness of the base plate.

7. The pattern grooving machine of claim 1, including at least one pair of rollers disposed to each side of said base plate dimensioned so as to provide a virtual plane surface that extends in a plane parallel to a surface of the base plate and spaced therefrom.

8. The pattern grooving machine of claim 1, wherein the base plate is adapted to be disposed in spaced relationship to the trimmer base.

9. The router die of claim 2, wherein the rollers provide a virtual plane surface that extends in a plane parallel to a surface of the base plate and spaced therefrom.

10. The router die of claim 2, wherein the base plate is disposed in spaced relationship to the trimmer base.

11. The router die of claim 2, wherein the first guide member and the second guide member are cylindrical, the first guide member having a diameter less than the diameter of the second guide member.

12. The router die of claim 11, wherein the diameter of the first guide members is about 1/16 in. and the diameter of the second guide member is about 1/8 in.

13. The router die of claim 2, wherein the rollers extend from opposite sides of the base plate.

14. The router die of claim 13, wherein the rollers have a diameter greater than the thickness of the base plate.

* * * * *